United States Patent
Shin et al.

(10) Patent No.: US 9,026,285 B2
(45) Date of Patent: May 5, 2015

(54) BATTERY CHARGING METHOD AND SYSTEM FOR HYBRID VEHICLE AND THE HYBRID VEHICLE USING THE SAME

(75) Inventors: Gwang Seob Shin, Gyeonggi-do (KR); Yeonho Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 324 days.

(21) Appl. No.: 13/534,917

(22) Filed: Jun. 27, 2012

(65) Prior Publication Data
US 2013/0138282 A1 May 30, 2013

(30) Foreign Application Priority Data
Nov. 30, 2011 (KR) .................. 10-2011-0127269

(51) Int. Cl.
| | |
|---|---|
| *B60W 20/00* | (2006.01) |
| *B60L 11/12* | (2006.01) |
| *B60L 11/14* | (2006.01) |
| *B60L 11/18* | (2006.01) |
| *B60W 10/26* | (2006.01) |

(Continued)

(52) U.S. Cl.
CPC .............. *B60L 11/18* (2013.01); *B60L 11/12* (2013.01); *B60L 11/14* (2013.01); *B60L 11/1862* (2013.01); *B60W 10/26* (2013.01); *B60W 20/00* (2013.01); *B60W 20/106* (2013.01); *B60W 30/18054* (2013.01); *B60W 2510/101* (2013.01); *B60W 2510/244* (2013.01); *B60Y 2400/76* (2013.01); *H02J 7/00* (2013.01); *H02J 7/044* (2013.01); *H02J 2007/005* (2013.01); *Y10S 903/902* (2013.01)

(58) Field of Classification Search
USPC ........ 701/22; 180/65.265; 903/930, 947, 902; 477/34

See application file for complete search history.

(56) References Cited

U.S. PATENT DOCUMENTS

| | | | | |
|---|---|---|---|---|
| 5,215,159 | A | * | 6/1993 | Nishida .................. 180/179 |
| 5,928,110 | A | * | 7/1999 | Vornehm et al. ............... 477/166 |

(Continued)

FOREIGN PATENT DOCUMENTS

| | | | | |
|---|---|---|---|---|
| EP | 2022748 | A1 | * | 2/2009 |
| GB | 2455062 | A | * | 6/2009 |

(Continued)

OTHER PUBLICATIONS

Schoner, H.-P., Hille, P., "Automotive power electronics. New challenges for power electronics," vol. 1, Publication Year: 2000, pp. 6-11 vol. 1.*

(Continued)

*Primary Examiner* — Tuan C. To
(74) *Attorney, Agent, or Firm* — Mintz Levin Cohn Ferris Glovsky and Popeo, P.C.; Peter F. Corless

(57) ABSTRACT

A battery charging method for a hybrid vehicle and the hybrid vehicle using the same are disclosed. The hybrid vehicle includes an engine and a motor as power source and includes the battery in which electrical energy for driving the motor is stored. The method and system may include: determining whether the battery needs to be charged while the vehicle is stopped; transitioning a transmission to a neutral position (N position) when the battery needs to be charged; starting the engine and engaging an engine clutch to connect the engine with the motor so that the motor generates electrical energy via power from the engine. The electrical energy generated by the motor is then stored in the battery accordingly.

12 Claims, 3 Drawing Sheets

(51) Int. Cl.
*B60W 30/18* (2012.01)
*H02J 7/00* (2006.01)
*H02J 7/04* (2006.01)

(56) References Cited

U.S. PATENT DOCUMENTS

| | | | |
|---|---|---|---|
| 6,637,530 B1* | 10/2003 | Endo et al. | 180/65.25 |
| 6,712,165 B1* | 3/2004 | Okazaki | 180/65.21 |
| 7,318,787 B2* | 1/2008 | Tabata et al. | 477/3 |
| 8,121,768 B2* | 2/2012 | Heap et al. | 701/54 |
| 2001/0049570 A1* | 12/2001 | Yamaguchi et al. | 701/22 |
| 2002/0000134 A1* | 1/2002 | Yamamoto et al. | 74/335 |
| 2003/0114266 A1* | 6/2003 | Bauer | 475/271 |
| 2007/0255477 A1* | 11/2007 | Okuda et al. | 701/93 |
| 2008/0017427 A1* | 1/2008 | Nakanowatari | 180/65.2 |
| 2008/0139360 A1* | 6/2008 | Hayashi et al. | 477/3 |
| 2008/0319594 A1* | 12/2008 | Shibata et al. | 701/22 |
| 2009/0118085 A1* | 5/2009 | Heap | 477/5 |
| 2009/0227409 A1* | 9/2009 | Ito et al. | 475/5 |
| 2010/0191400 A1* | 7/2010 | Ajiro | 701/22 |
| 2011/0218699 A1* | 9/2011 | Petzold | 701/22 |
| 2011/0246032 A1* | 10/2011 | Steinborn et al. | 701/51 |
| 2012/0108385 A1* | 5/2012 | Sano et al. | 477/5 |
| 2012/0123621 A1* | 5/2012 | Kishi et al. | 701/22 |
| 2012/0259496 A1* | 10/2012 | Ikegami | 701/22 |

FOREIGN PATENT DOCUMENTS

| | | |
|---|---|---|
| JP | 2006180665 A | 7/2006 |
| JP | 2006-275010 A | 10/2006 |
| JP | 2009-018743 A | 1/2009 |
| WO | WO 2010051724 A1 * | 5/2010 |
| WO | WO 2010131942 A1 * | 11/2010 |

OTHER PUBLICATIONS

Moreno, J., Ortuzar, M.E., Dixon, J.W., "Energy-management system for a hybrid electric vehicle, using ultracapacitors and neural networks," vol. 53, Issue: 2, Publication Year: 2004, pp. 116-124.*

* cited by examiner

BATTERY CHARGING METHOD AND SYSTEM FOR HYBRID VEHICLE AND THE HYBRID VEHICLE USING THE SAME

CROSS-REFERENCE TO RELATED APPLICATION

This application claims priority to and the benefit of Korean Patent Application No. 10-2011-0127269 filed in the Korean Intellectual Property Office on Nov. 30, 2011, the entire contents of which are incorporated herein by reference.

BACKGROUND OF THE INVENTION (a) Field of the Invention

The present invention relates to a battery charging system and method for a hybrid vehicle and the hybrid vehicle using the same. More particularly, the present invention relates to a battery charging system and method and a vehicle using the same that use a main drive motor to charge the battery.

(b) Description of the Related Art

A hybrid vehicle is a vehicle that uses two or more distinct power sources to move the vehicle. The term most commonly refers to hybrid electric vehicles (HEVs), which combine an internal combustion engine and one or more electric motors powered by a battery. However, alternative forms of hybrid vehicles do exist, Hybrid Fuel cell vehicles. Hybrid vehicles have become increasingly popular over the last couple of years due to their high fuel efficiency and low impact on the environment.

Generally, hybrid vehicles can be split into two distinct species, parallel type hybrids and series type hybrid. In a parallel hybrid one or more electric motors and an internal combustion engine are installed so that they can both individually or together power the vehicle. However in a series hybrid the vehicle is driven by the electric motor with no mechanical connection to the engine. Instead the engine is configured to run a generator when the battery pack energy supplied to the motor isn't or is being charged.

Additionally, hybrid vehicles can also be compound type hybrid in which power paths from the engine to the wheels that can be either mechanical or electrical. The main principle behind this system is the decoupling of the power supplied from the engine (or other primary source, such as a fuel cell) from the power demanded by the driver. Thus, these types of hybrid vehicles mix the elements of a parallel hybrid and a series hybrid vehicle.

Most hybrid electric vehicles include a low voltage battery in which low DC voltage (e.g., 24V) is stored in addition to high voltage battery (e.g., 500V). Lighting devices such as the head lamps or a brake lights, air conditioning devices (e.g., the compressor or condenser, sound systems, or control devices such as various controllers or a vacuum pump for applying the brakes are operated by power from the low voltage battery.

Since a portion of the energy powering the vehicle in a hybrid comes from the batteries, charging the batteries is very important in hybrid electric vehicles. Charging method differs according to operating modes in for example a parallel hybrid. In the conventional design, small amounts of power can be restored in the battery via a hybrid starter generator (HSG), but the battery cannot be charged via the main (drive) motor when the vehicle is stopped. On the contrary, the battery can be charged via the main motor only when the vehicle is running or in motion. Thus, since the battery may not receive a sufficient restoration of power from the HSG when the vehicle is stopped, the battery may become completely drained. When the battery becomes drained beyond a certain threshold, the motor cannot be sufficiently used when the vehicle begins to move. Therefore, drivability of the hybrid vehicle and fuel economy may be deteriorated significantly as a result.

When the vehicle is stopped on a road having a slope less than or equal to a predetermined slope (for example, 4%), an under-drive (UD) clutch in a transmission is slips once the battery becomes charged in a neutral position to provide power to a motor to operate the vehicle. When the vehicle, however, is stopped on a road having a slope greater than the predetermined slope, slip energy is very excessive and the battery cannot be charged by using the motor in a neutral position. Therefore, charging methods for the hybrid vehicle should be studied and improved so as to charge the battery in various environments efficiently.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a battery charging method for a hybrid vehicle having advantages of driving the vehicle efficiently at a hybrid mode and improving fuel economy of the vehicle by enabling of charging a battery while the vehicle is stopped.

In addition, the present invention has been made in an effort to provide a hybrid vehicle having advantages of improving drivability of the vehicle and facilitating management of a battery by using a main (drive) motor while the vehicle is stopped regardless of slope of a road.

Technical objects that the present invention will achieve are not limited to the above-mentioned technical objects, and other technical objects that are not mentioned in this specification can be clearly understood by a person skilled in the art based on the disclosure of the present invention.

A battery charging method for a hybrid vehicle according to an exemplary embodiment of the present invention is a method of charging the battery for the hybrid vehicle that includes an engine and a motor as power source and includes the battery in which electrical energy for driving the motor is stored.

The method may include: determining, by a controller, whether a battery needs to be charged when the vehicle is stopped; shifting a transmission to a neutral position (N position) when the battery needs to be charged; providing a command from the controller to the engine; engaging an engine clutch for connecting the engine with the motor to allow the motor to generate electrical energy via power from the engine; and storing the electrical energy generated by the motor in the battery. The engine clutch may synchronize with a starting timing of the engine when the clutch is engaged.

The method may further include: determining, by the controller, whether a brake has begun to be released while the vehicle is stopped; reducing a speed of the motor to be less than or equal to a safe speed once the brake is released; and transitioning the transmission to a drive position (D position) by engaging a low-speed clutch in the transmission. For example, the safe speed may be less than or equal to 300 rpm. The hybrid vehicle may be started by using a restricted slipping function once the brake has begun to be released.

A hybrid vehicle according to another exemplary embodiment of the present invention may include: a state monitoring portion configured to monitor state information including state of charge (SOC) of the battery of the vehicle; a transmission configured to be transitioned/shifted into a neutral position when the SOC of the battery is less than or equal to a predetermined value once the vehicle is stopped; and an engine clutch configured to synchronize with a timing of operation position conversion of the transmission to engage/connect the engine with the motor. In this case, the motor generates electrical energy via power from the engine, and the generated electrical energy is stored in the battery.

The motor may be controlled to enter a charging ready state when the transmission is shifted into the neutral position. A speed of the motor may be reduced to be less than or equal to a safe speed once a brake is released while the electrical energy is being stored in the battery.

The transmission may include a low-speed clutch that is configured to transition the transmission to a drive position (D position) once the brake is released after the vehicle has been stopped so that the vehicle may again resume moving by using restricted slip.

BRIEF DESCRIPTION OF THE DRAWINGS

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DESCRIPTION OF SYMBOLS

Figure 1:
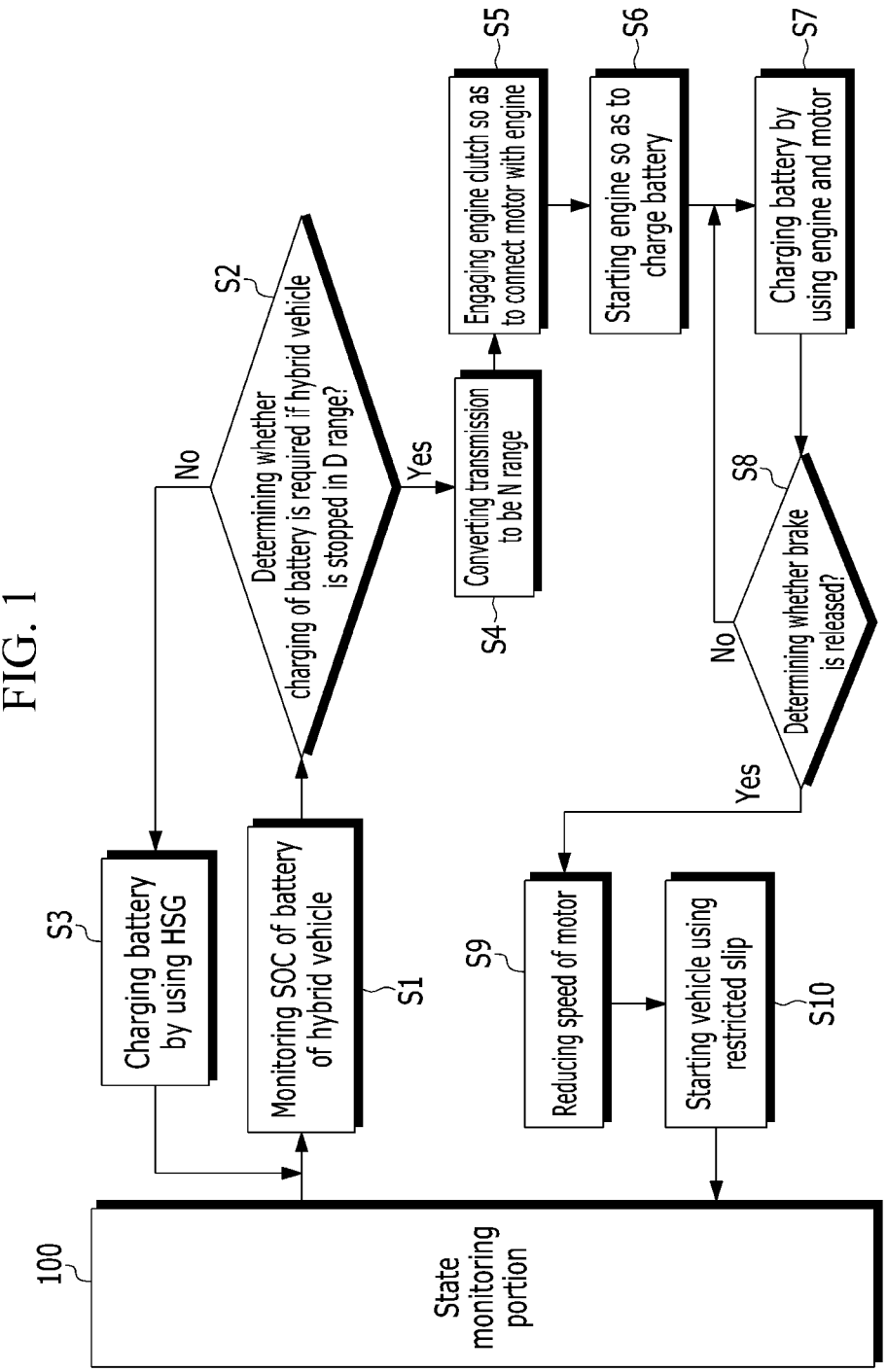
FIG. 1 is a flowchart of a battery charging method for a hybrid vehicle according to an exemplary embodiment of the present invention.

100: state monitoring portion
200: power generating apparatus
201: engine
202: engine clutch
203: motor
204: transmission
205: low-speed clutch
206: battery
207: inverter
208: wheel
209: integrated starter-generator (hybrid starter generator)

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION OF THE EMBODIMENTS

Exemplary embodiments of the present invention will be described in detail with reference to the accompanying drawings such that a person skilled in the art can easily practice the present invention. The present invention can be achieved in various forms and is not limited to exemplary embodiments that are described herein.

Components that are not directly related to the present invention will be omitted in order to describe the present invention clearly, and the same or similar reference numerals are used for the same or similar constituent elements in the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

In overall specification, in addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function or operation, and can be implemented by hardware components or software components and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 is a flowchart of a battery charging method for a hybrid vehicle according to an exemplary embodiment of the present invention. Referring to FIG. 1, a battery charging method for a hybrid vehicle according to an exemplary embodiment of the present invention begins when a state monitoring portion 100 acquires state information.

The state monitoring portion 100 may be devices (e.g., one or more controllers, computers, etc.) which collect information on vehicle states from systems monitoring various vehicle states, or may be devices which collect and display the information on the vehicle states from detecting means such as sensors. The vehicle states are not limited, but may be state information on driving state, running state, SOC, brake state, or safety state of components of the hybrid vehicle.

A battery charging system of the hybrid vehicle to which the battery charging system and method for a hybrid vehicle according to an exemplary embodiment of the present invention is applied acquires monitoring information on the SOC of the battery of the hybrid vehicle from the state monitoring portion 100. That is, the SOC of the battery of the hybrid vehicle is continuously monitored at step S1.

When the hybrid vehicle stops in a D position, the state monitoring portion (e.g., the controller) determines whether the battery of the vehicle needs to be charged based on the monitoring information on the SOC of the battery at step S2. When the SOC of the battery is above a predetermined threshold (e.g., 50%) and charging of the battery is not required at the step S2, the battery is charged using a hybrid starter generator (HSG) at step S3.

The hybrid starter generator (HSG) may be an integrated starter-generator which operates as a motor when the engine of the hybrid vehicle is started and operates as a generator when electric power needs to be generated. Since the vehicle is stopped in the D position at the step S2, the engine causes the HSG to generate electricity. Since the amount of power that the HSG can provide to the battery at the step S3 is limited, the step S3 is performed only when the SOC of the battery is above a predetermined threshold.

When the SOC of the battery is below the predetermine threshold and the battery should be charged at the step S2, the transmission is shifted/transitioned into a neutral position (N position) at step S4. After that, the engine clutch is engaged and a drive motor (main motor) is thereby connected with the engine at step S5.

After that, the engine is operated so as to charge the battery by using the main motor at step S6. In this case, the main motor operates as a generator by using power from the engine and the battery is charged at step S7. According to another exemplary embodiment of the present invention, the sequence is not limited and the engine clutch may be engaged instantly upon starting the engine.

While the main motor is operating as the generator and the battery is being charged at the step S7, the controller/state monitoring portion determines whether the brake has begun to be released in order for the vehicle to begin moving at step S8.

When the vehicle is still stopped and the brake is not released, the method returns to the step S7 and continues to charge the battery by using the drive motor. When the brake, however, begins to be released to allow the vehicle to move, a speed of the main motor is reduced at step S9. In addition, the engine clutch is released, e.g., as soon as the speed of the main motor is reduced.

Reduction speed of the main motor is not limited, however. In one exemplary embodiment, the speed of the main motor may be reduced to a speed under 300 rpm or an allowance speed of a low-speed clutch (e.g., UD clutch) which bears the first forward speed in a D position may be used as the safe speed value.

When the speed of the main motor is sufficiently reduced to the safe speed at the step S9, the low-speed clutch (e.g., UD clutch) in the transmission (e.g., gear box) is engaged so that the transmission is transitioned to the D position and the vehicle begins to run at step S10. As stated above, the safe speed may of the engine may be 300 rpm, and the vehicle can be started by using restricted slip once the speed of the motor is reduced under 300 rpm. In one exemplary embodiment, the low-speed clutch may be safely engaged and the vehicle may begin to move after the main motor is stopped. When the vehicle begins to move at the step S10, the state monitoring portion 100 again obtains information related to the state of components, running state, battery state, brake state, and so on.

Since the battery can be charged using the main motor regardless of the slope of an inclined road according to an exemplary embodiment of the present invention, the battery may be sufficiently charged under any driving state of the vehicle. Since a slope sensor is not used like in a conventional charging method for the hybrid vehicles, manufacturing costs of the vehicle may be reduced.

For example, in the conventional hybrid vehicle, after the battery is charged by using the HSG in the N position, the low-speed clutch in the transmission is slipped to allow the vehicle to begin moving when a slope of the road is less than or equal to a predetermined slope (e.g., about 4%). When the vehicle, however, is stopped on a road having a slope greater than the predetermined slope, slip energy is very excessive and the battery cannot be charged by using the motor in the N position. Since the battery can be charged by using the main motor regardless of slope of the road according to an exemplary embodiment of the present invention, charging efficiency of the vehicle may be improved.

Figure 2:
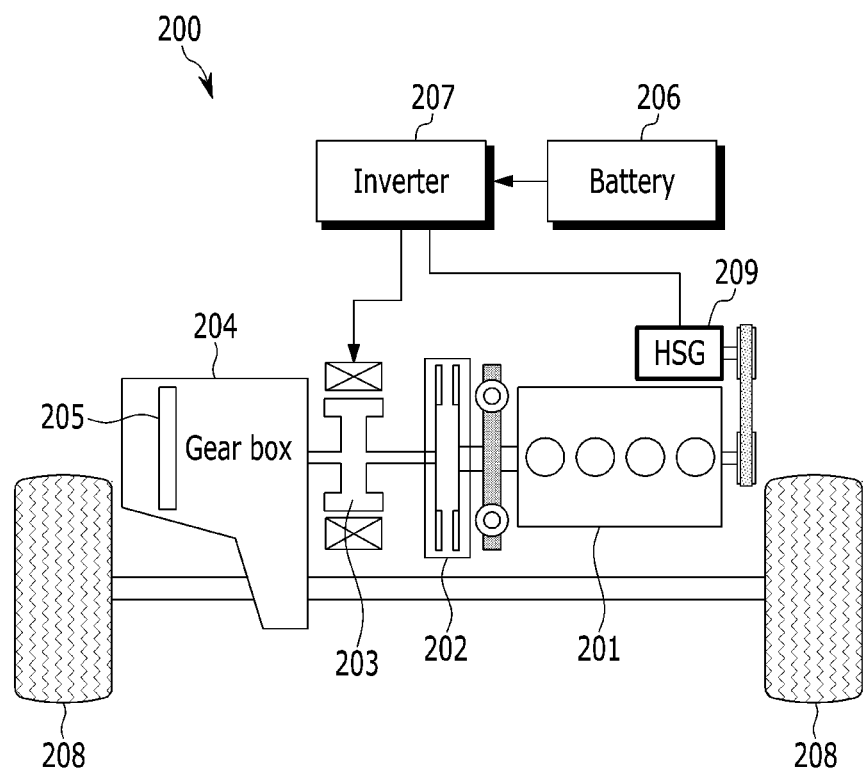
FIG. 2 is a schematic diagram of a hybrid vehicle using a battery charging method shown in FIG. 1.

FIG. 2 is a schematic diagram of a hybrid vehicle using a battery charging method shown in FIG. 1. That is, constituent elements of the hybrid vehicle which is not related to the battery charging method according to an exemplary embodiment of the present invention are omitted, and constituent elements which are related to the battery charging method according to an exemplary embodiment of the present invention are illustrated in FIG. 2.

As shown in FIG. 2, the hybrid vehicle performing the battery charging method according to an exemplary embodiment of the present invention includes a power generating apparatus 200. The power generating apparatus 200 includes the engine 201, the engine clutch 202, the motor 203, the transmission (gear box) 204, the low-speed clutch 205 included in the transmission, and the integrated starter-generator 209. The power generating apparatus 200 of the hybrid vehicle selectively delivers driving torque of the engine 201 and/or driving torque of the motor 203 to the wheels 208 and drives the vehicle accordingly. The power generating apparatus 200 of the hybrid vehicle is connected to the battery charging system, and the battery charging system includes the battery 206 and an inverter 207 connected to the motor 203.

The hybrid vehicle may use the engine 201 and the motor 203 as power sources respectively or in combination. When the vehicle begins to move or is moving at a low speed, the engine clutch 202 is released and only the driving torque of the motor 203 is delivered to the wheels 208 of the vehicle (e.g., in an electric vehicle mode). When the vehicle moves at a high speed, the engine clutch 202 may be engaged and the driving torques of the engine 201 and the motor 203 are delivered to the wheels 208 of the vehicle (e.g., in a hybrid mode).

The integrated starter-generator 209 may be a hybrid starter generator (HSG) and is connected to the engine 201 via e.g., a belt. When the vehicle is transitioned from an electric vehicle mode to a hybrid mode, the integrated starter-generator 209 starts the engine 201. Generally, the integrated starter-generator 209 can be used to provide a small amount of charge to the battery when the battery cannot be charged by the main motor (e.g., when the vehicle is stopped) in the hybrid vehicle. However, charging of the battery by using the integrated starter-generator 209 is very limited as discussed above.

Since the hybrid vehicle according to an exemplary embodiment of the present invention is a hybrid vehicle of parallel type where both of the engine and the motor are used for driving the vehicle, the battery can be charged by using the main motor 203 by controlling engaging/releasing of the engine clutch 202 and position/mode of the transmission 204.

The engine clutch 202 is provided between the engine 201 and the motor 203 that are power sources of the hybrid vehicle. When the vehicle is stopped, the engine clutch 202 is released, generally. After the transmission 204 is transitioned to be in an N position, however, the engine clutch 202 may be again engaged to connect the engine 201 with the motor 203. According to a conventional hybrid vehicle, the engine clutch 202 instead remains released/disengaged and the battery is charged by the integrated starter-generator 209 connected to the engine 201 while the vehicle is stopped. However, according to the exemplary embodiment of the present invention, the transmission 204 is transitioned to the N position and the engine clutch 202 is engaged with the engine while the vehicle is stopped. At this time, the engine 201 operates and the battery 206 is charged by the main (drive) motor 203 connected to the engine 201 through the engine clutch 202. Therefore, large amount of power can be restored in the battery 206 while the vehicle is stopped.

The power generated by using the motor 203 is stored in the battery 206 through the inverter 207. The SOC of the battery 206 can be monitored in real time by monitoring systems such as the state monitoring portion 100. In addition, the power generating apparatus 200 of the hybrid vehicle may further include a control portion (not shown) for controlling operation of the motor 203 or the engine 201. Particularly, the control portion receives information on the SOC of the battery when the SOC of the battery detected by the state monitoring portion 100 of the hybrid vehicle is insufficient. In this case, the control portion controls the transmission 204 to engage the N position and controls the motor 203 to enter a charging ready state once the vehicle is stopped. In addition, the control portion may control the motor to enter the charging ready state and control the engine 201 to be started.

Additionally, the speed of the motor 203 may be reduced and the engine clutch 202 may be released once the brake is released or while the brake is being released and the vehicle may again begin to move after the battery has been charged by using the main motor 203.

The transmission 204 may be a gear box. The transmission 204 may convert torque generated by the engine 201 or the motor 203 according to running state of the vehicle and delivers the converted torque to the wheels 208. When the battery 206 needs to be charged while the vehicle is stopped, the transmission 204 is transitioned/shifted by the control portion to the N position.

As stated above, if the battery charge is above a predetermined threshold (e.g., 50%) the HSG charges the battery as normal. However, when the SOC of the battery is insufficient (i.e., below the predetermined threshold), and the brake has not been released, the transmission 204 is transitioned to the N position and then the engine clutch 202 is engage again to charge the battery 206 via the engine 201 through the motor 203.

The low-speed clutch 205 may included in the transmission 204, and 5 may be an under-drive clutch (UDC). When the brake is released and the vehicle begins to move, the low-speed clutch 205 is engaged and the transmission 204 is shifted/transitioned into the D position. Therefore, the vehicle can move accordingly. At this time, the speed of the motor 203 may be reduced to a value that is less than or equal to a safe speed or the motor 203 may be stopped.

Figure 3:
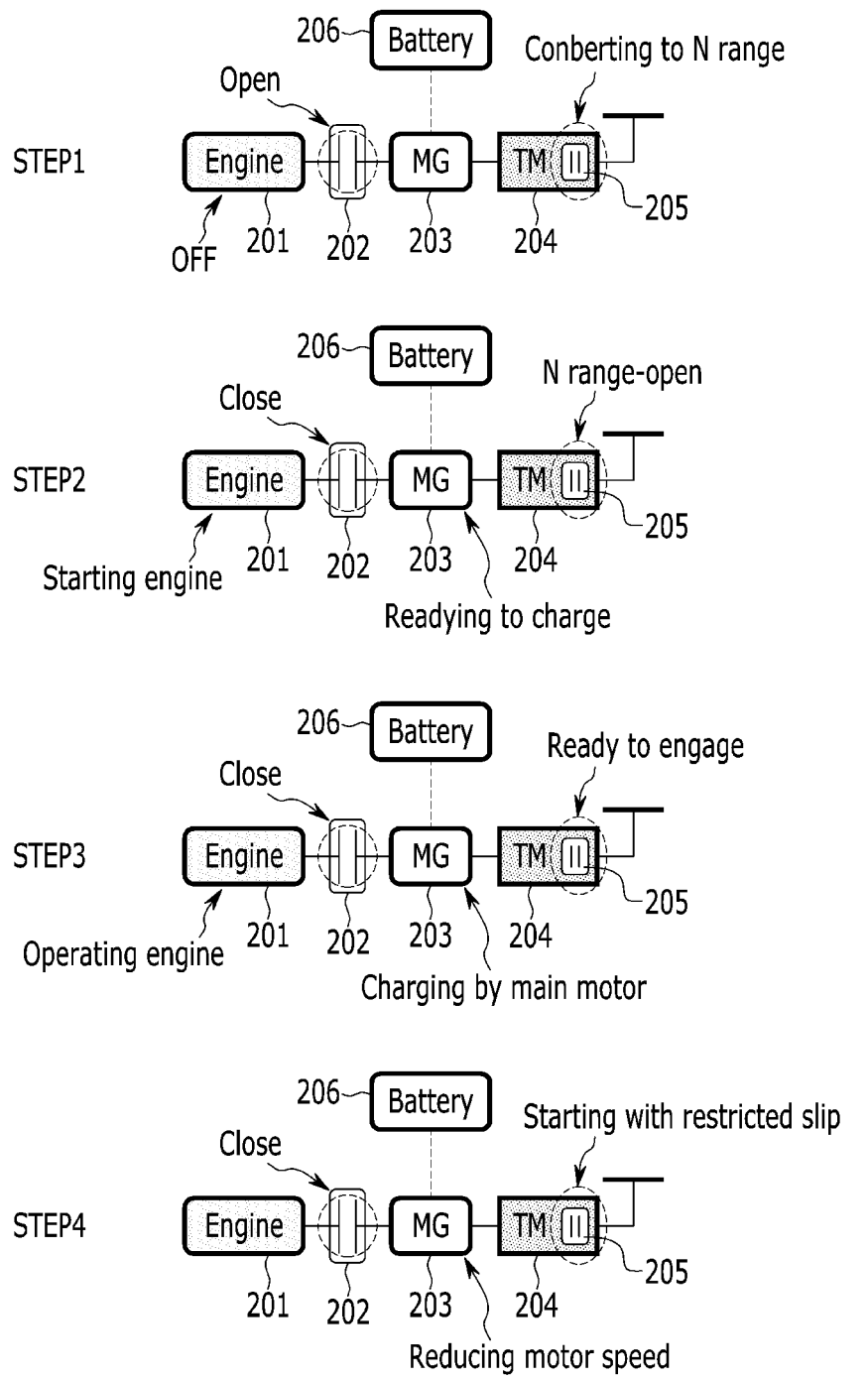
FIG. 3 is a schematic diagram for showing operation of a hybrid vehicle at each step of a battery charging method for a hybrid vehicle according to an exemplary embodiment of the present invention.

FIG. 3 is a schematic diagram for showing operation of a hybrid vehicle at each step of a battery charging method for a hybrid vehicle according to an exemplary embodiment of the present invention.

STEP 1 in FIG. 3 shows operation of the power generating apparatus 200 when the vehicle is stopped while the transmission 204 is in the D position and information related to a low SOC of the battery is input to the state monitoring portion 100 of the hybrid vehicle.

Since charging of the battery is required at the STEP 1, the transmission 204 of the power generating apparatus is transitioned to the N position. At this time, the engine clutch 202 disposed between the engine 201 and the main motor 203 and selectively connecting the engine 201 and the main motor 203 is released. Since the vehicle is stopped, the engine 201 is not driven.

Referring to FIG. 2, the engine 201 is connected to the hybrid starter generator (HSG) 209 on an opposite side of the engine clutch 202.

According to a conventional hybrid vehicle, torque is not delivered to the transmission while the vehicle is stopped. However, in the exemplary embodiment of the present invention, the transmission 204 is transitioned into the N position to charge the battery via the motor by reengaging the clutch 202 once the transmission has been transitioned into neutral.

STEP 2 illustrates that the engine 201 is again started to charge the battery 206. At this time, the transmission 204 is engaged to the N position and the motor 203 begins charging the battery once the clutch 202 has been reengaged. In some exemplary embodiments of the present invention, the clutch 202 may remain engaged while the transmission is shifted into an N position. In addition, the engine clutch 202 may be engaged instantly before the engine 201 is started or simultaneously while the engine 201 is being started.

STEP 3 illustrates the charging process of the battery. That is, the engine 201 is charging the battery, and the main motor 203 connected to the engine 201 through the engine clutch 202 functions as a generator by operation of the engine and supplies charging power to the battery 206.

According to a conventional hybrid vehicle, however, the battery would not be charged by using the motor 203. Therefore, the engine clutch 202 is released to disconnect the engine 201 from the motor 203, and the engine 201 operates to charge the battery through the HSG 209. However, as stated above, the HSG 209 can only supply small amount of power and it is hard to charge the battery sufficiently.

STEP 4 shows that the brake is released and the vehicle has again begun move. The low-speed clutch 205, for example the UD clutch is engaged for restarting the vehicle and the transmission 204 is transitioned from the N position to the D position. After that, the vehicle begins to move again. The low-speed clutch 205 of the transmission 204 is engaged after the speed of the main motor 203 is reduced to a speed at or equal to a safe speed. As described above, the safe speed of the motor may be 300 rpm. However, the safe speed is not limited to 300 rpm. Once the speed of the motor 203 has been reduced and the low-speed clutch 205 is engaged, the vehicle begins to move using restricted slip.

Since the engine clutch 202 is engaged at this state, the hybrid vehicle is driven by the motor 203 and the engine 201. In conventional hybrid vehicles, however, the engine 201 is started by the HSG, the engine clutch 202 is engaged, and the motor 203 starts to run.

Operation of the power generating apparatus of the hybrid vehicle related to charging the battery according to an exemplary embodiment of the present invention is shown in the FIG. 3. Since operation of the power generating apparatus related to driving the hybrid vehicle is well known to a person skilled in the art, detailed description thereof will be omitted from this specification.

Although the above exemplary embodiment is described as using a single control portion to perform the above process, it is understood that the above processes may also be performed by a plurality of control portions, controllers, processors or the like.

Furthermore, the control logic (of the control portion) of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the battery can be sufficiently charged while a hybrid vehicle is stopped according to an exemplary embodiment of the present invention, drivability and fuel economy of the hybrid vehicle may be improved. In addition, management of the SOC of the battery for driving the main motor may be facilitated and the main motor can be fully utilized. Therefore, driving efficiency of the hybrid vehicle may be enhanced as well. Since the battery can be charged by using the main motor regardless of slope of the inclined road while the vehicle is stopped, a slope sensor is not necessary. Therefore, manufacturing costs of the vehicle may be curtailed as well.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery charging method for a hybrid vehicle that comprises an engine and a motor as power source and comprises a battery in which electrical energy for driving the motor is stored, the battery charging method comprises:
   determining, by a controller, whether the battery in the vehicle needs to be charged once the vehicle is stopped;
   in response to determining that the battery needs to be charged, transitioning a transmission to a neutral position (N position);
   starting, by the controller, the engine;
   engaging an engine clutch to connect the engine with the motor to generate by the motor electrical energy via power from the engine;
   storing the electrical energy generated by the motor in the battery while the vehicle is stopped;
   determining whether a brake is released while the vehicle is stopped;
   reducing a speed of the motor to be less than or equal to a safe speed once the brake is released; and
   transitioning the transmission to a drive position (D position) by engaging a low-speed clutch in the transmission.

2. The battery charging method of claim 1, wherein the engine clutch synchronizes with a starting timing of the engine when the engine clutch is engaged.

3. The battery charging method of claim 1, wherein the hybrid vehicle is started via a restricted slipping function once the brake is released.

4. The battery charging method of claim 1, wherein the safe speed is less than or equal to 300 rpm.

5. A hybrid vehicle that comprises an engine and a motor as power source and comprises a battery in which electrical energy for driving the motor is stored, the hybrid vehicle comprises:
   a state monitoring portion configured to monitor state information including state of charge (SOC) of the battery of the vehicle;
   a transmission configured to be transitioned to a neutral position when the SOC of the battery is less than or equal to a predetermined value while the vehicle is stopped; and
   an engine clutch configured to synchronize with a timing of position conversion of the transmission to engage the engine with the motor,
   wherein the motor generates the electrical energy via power from the engine, and the generated electrical energy is stored in the battery, and
   wherein a speed of the motor is reduced to be less than or equal to a safe speed while a brake is being released and the electrical energy is being stored in the battery.

6. The hybrid vehicle of claim 5, wherein the motor is controlled to enter a charging ready state once the transmission is transitioned to the neutral position.

7. The hybrid vehicle of claim 5, wherein the safe speed is less than or equal to 300 rpm.

8. The hybrid vehicle of claim 5, wherein the transmission comprises a low-speed clutch, and
   wherein the low-speed clutch transitions the transmission to a drive position (D position) once the brake is released while the vehicle is stopped to resume movement of the vehicle via a restricted slipping function.

9. A non-transitory computer readable medium containing program instructions executed by a processor or controller, the computer readable medium comprising:
   program instructions that determine whether a battery needs to be charged when a hybrid vehicle stops;
   program instructions that provide a command to transition a transmission to a neutral position (N position);
   program instructions that provide a command to start the engine;
   program instructions that provide a command to engage an engine clutch to connect the engine with the motor to generate by the motor electrical energy via power from the engine to store the electrical energy generated by the motor in the battery while the vehicle is stopped;
   program instructions that determine whether a brake is being released while the vehicle is stopped;
   program instructions that provide a command to reduce a speed of the motor to be less than or equal to a safe speed once the brake is released; and
   program instructions that provide a command to transition the transmission to a drive position (D position) by engaging a low-speed clutch in the transmission.

10. The non-transitory computer readable medium of claim 9, wherein the engine clutch synchronizes with a starting timing of the engine when the engine clutch is engaged.

11. The non-transitory computer readable medium of claim 9, wherein the vehicle is started via a restricted slipping function once the brake is released.

12. The non-transitory computer readable medium of claim 9, wherein the safe speed is less than or equal to 300 rpm.

* * * * *